United States Patent [19]

Alferness et al.

[11] 4,146,297
[45] Mar. 27, 1979

[54] TUNABLE OPTICAL WAVEGUIDE DIRECTIONAL COUPLER FILTER

[75] Inventors: Rodney C. Alferness; Ronald V. Schmidt, both of Matawan, N.J.

[73] Assignee: Bell Telephone Laboratories, Incorporated, Murray Hill, N.J.

[21] Appl. No.: 869,515

[22] Filed: Jan. 16, 1978

[51] Int. Cl.² .............................................. G02B 5/14
[52] U.S. Cl. ................................................. 350/96.14
[58] Field of Search .................................... 350/96.14

[56] References Cited

U.S. PATENT DOCUMENTS

| | | | |
|---|---|---|---|
| 3,589,794 | 6/1971 | Marcatili | 350/96.14 |
| 3,850,503 | 11/1974 | Riseberg et al. | 350/96.14 |
| 3,896,402 | 7/1975 | Jackson | 333/73 |
| 3,909,108 | 9/1975 | Taylor | 350/96.14 |
| 3,957,341 | 5/1976 | Taylor | 350/96.14 |
| 4,012,113 | 3/1977 | Kogelnik et al. | 350/96.14 |
| 4,026,632 | 5/1977 | Hill et al. | 350/96.14 |

OTHER PUBLICATIONS

J. M. Hammer, "Metal Diffused Stripe Waveguides" *Applied Optics* vol. 15, No. 2 Feb. 1976 pp. 319-320.

*Primary Examiner*—John K. Corbin
*Assistant Examiner*—Stewart Levy
*Attorney, Agent, or Firm*—Daniel D. Dubosky

[57] ABSTRACT

An integrated optical filter composed of coupled non-identical strip waveguides in LiNbO₃ is disclosed. The device has a broad bandwidth, is tunable over several hundred angstroms, and offers electrical control of the crossover efficiency. Several devices are combined on a single substrate to provide an electrically tunable multiplexer or demultiplexer.

8 Claims, 9 Drawing Figures

TUNABLE OPTICAL WAVEGUIDE DIRECTIONAL COUPLER FILTER

BACKGROUND OF THE INVENTION

In future optical fiber communication systems it is likely that several optical carriers of different wavelength will be multiplexed onto a single fiber to increase its information carrying capacity. Recently wavelength multiplexers have been demonstrated which are compatible with multimode fibers. These multiplexers use graded index lenses and bulk frequency selective elements such as dielectric mirrors, prisms, and diffraction gratings. Several prior art integrated optical filters have been based on Bragg reflection in corrugated slab waveguides. These high reflectivity grating devices have generally been rather narrowband and not suitable for use with semiconductor lasers whose operating wavelength can drift over tens of angstroms.

One prior art filter which does have sufficient bandwidth is disclosed in U.S. Pat. No. 3,957,341, issued May 18, 1976 to H. F. Taylor, and entitled "Passive Frequency-Selective Optical Coupler." This filter by Taylor utilizes a directional coupler composed of two nonidentical strip waveguides which have intersecting dispersion diagrams. Wavelengths near the intersection of the dispersion diagrams, where the waveguides are phase matched, are able to transfer across to the other waveguide which provides the filtering function. The bandwidth of the filter is determined by the relative waveguide dispersion and the length of the coupler. Filters of this type can be contrasted to grating filters in that the filter structure inherently provides channel separation of the filtered light in a strip waveguide. The filter is also easily broadbanded. However, the filter as proposed by Taylor suffers from two drawbacks — both the filter center wavelength and its crossover efficiency are subject to rather critical fabrication tolerances.

SUMMARY OF THE INVENTION

This invention relates to optical filters of the type constructed of two nonidentical strip dielectric waveguides that are positioned in a substrate so as to be proximate to each other for a predetermined interaction length. Since the waveguides are nonidentical, they can be fabricated to have distinctly separate dispersion characteristics versus wavelength such that the two guides have the identical effective index at only a single wavelength, called the phasematch wavelength $\lambda_0$. Only for wavelengths near the phasematch value is energy permitted to be coupled from one guide into the other, the crossover efficiency being greater for wavelengths nearer $\lambda_0$ and effectively zero for wavelengths sufficiently removed from $\lambda_0$. In accordance with the present invention, two pairs of electrodes are deposited in juxtaposition over or along the two waveguides. One electrode in each of the pairs of electrodes is positioned over or along one of the waveguides and the other electrode is positioned over or along the other strip waveguide. Accordingly, application of a potential to each of the electrode pairs causes an electrical field to be established in each of the two waveguides. By applying potentials to the electrodes the effective indices of the waveguides can be changed through the electro-optic effect and thus the wavelength at which maximum energy crossover occurs can be changed by varying the magnitude of the applied potentials. Furthermore, when the desired phasematch wavelength is reached, each of the potentials on the two electrode pairs is perturbed by a substantially equal but opposite amount in order to adjust the crossover efficiency at the filter center wavelength to a value close to 100 percent.

BRIEF DESCRIPTION

The invention will be more readily understood after reading the following detailed description in conjunction with the drawings wherein.

DETAILED DESCRIPTION

Figure 1:
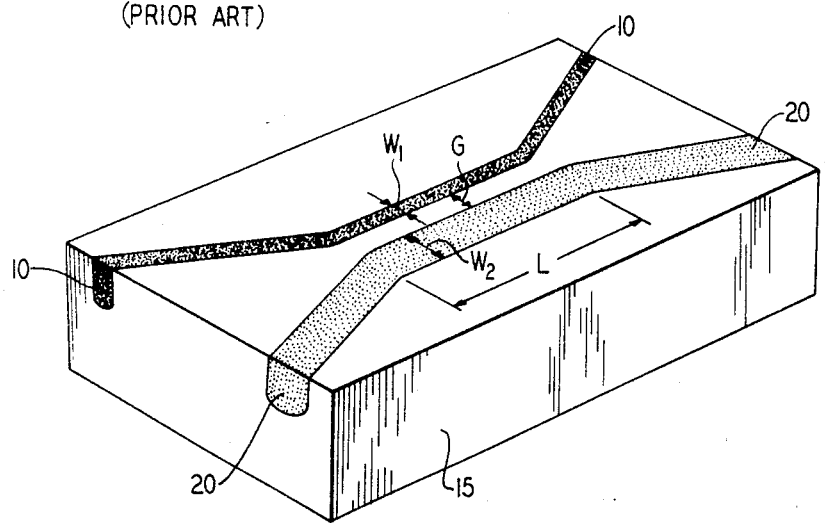
FIG. 1 is a pictorial diagram of a prior art filter of the type disclosed in the above-identified Taylor patent.

A prior art directional coupler filter of the type disclosed in the above-identified Taylor patent is shown in FIG. 1. In this type filter, two dielectric waveguides 10 and 20 are established in a lithium niobate substrate 15. The dielectric waveguides 10 and 20 are of different widths $w_1$ and $W_2$, respectively, and are caused to be proximate to each other at a gap G for a predetermined interaction length L. These strip waveguides can be formed in the lithium niobate substrate by first depositing titanium metal of thickness $\tau_1$ in two different widths $W_1$ and $W_2$ along paths of the desired waveguides on a z-cut surface using comformable mask photolith techniques. The narrower titanium strip having width $W_1$ is then masked-off with photoresist and the titanium metal previously deposited corresponding to the intended wider guide is ion beam etched down to a thinner thickness $\tau_2$. The titanium is then diffused into the lithium niobate at 980 degrees centigrade for 6 hours to form the waveguides. Because the metal thickness corresponding to the intended wider guide is less than that of the narrower guide, the wider guide has a smaller substrate-to-guide refractive index difference, $\Delta n_2$, compared with the narrower guide $\Delta n_1$. As a result, the guides have distinctly different dispersion relations with respect to wavelength.

Figure 5:
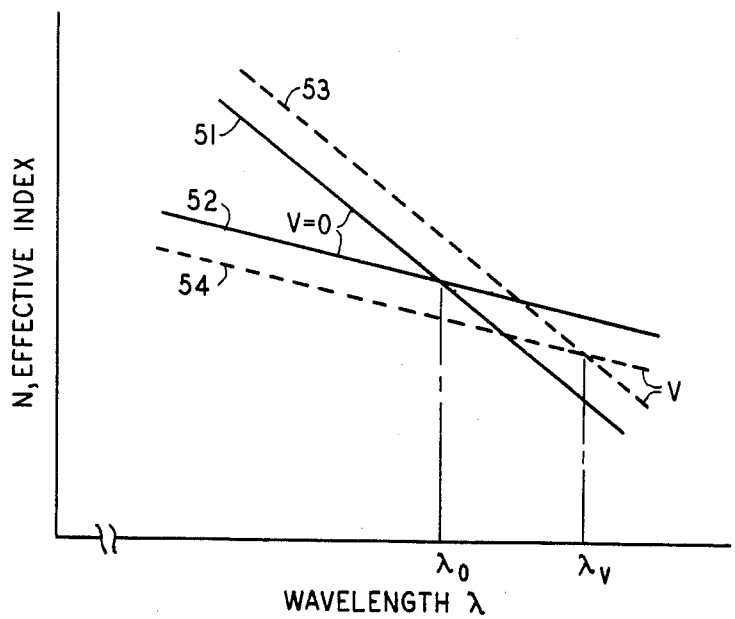

The dispersion relations for guides 10 and 20 in FIG. 1 are illustrated in FIG. 5 in terms of effective index, N, versus wavelength by curves 51 and 52, respectively. As indicated in FIG. 5, the effective index of the two guides 10 and 20 are equal at only one wavelength, $\lambda_0$. It is only near this phasematch wavelength that energy is coherently coupled from one guide into the other. At wavelengths other than the phasematch value the energy cannot coherently couple as strongly because of the difference in propagation velocities. By carefully controlling the metal thickness these dispersion relations can be controlled during fabrication and can theoretically be made to intersect at some desired center wavelength $\lambda_0$.

An attempt can be made to achieve crossover at a specific desired center wavelength by selecting the two guide widths $W_1$ and $W_2$, the guide depth h, and the thickness of the titanium metal deposits. The approximation formulas by J. M. Hammer can then be utilized to calculate the required parameters. See the article entitled, "Metal Diffused Stripe Waveguides: Approximate Closed Form Solution for Lower Order Modes," by J. M. Hammer, Applied Optics, Vol. 15, No. 2, February 1976, pages 319-320. The filter that is constructed in this way can then be tested to determine the achieved crossover wavelength. In addition, measurements can be made to determine the waveguide parameters for each of the strip waveguides, and the results of these measurements can then be used to determine what changes in metal thickness and/or guide widths are required to achieve the desired center wavelength. Alternatively, two or more filters can be made with changes in the metal thickness and guide widths. The crossover wavelengths for these filters can then be plotted versus both thickness and/or width, in order to use an extrapolation technique to determine what the various dimensions should be to achieve a specific desired center wavelength.

As pointed out hereinabove, however, the fabrication tolerances are such that even when using the above-described techniques it is difficult at the present state of technology to establish precisely the crossover wavelength at a predetermined desired wavelength. This is not surprising in view of the fact that a change in one angstrom of metal thickness results typically in a shift of approximately 25Å in the center wavelength.

Figure 4:
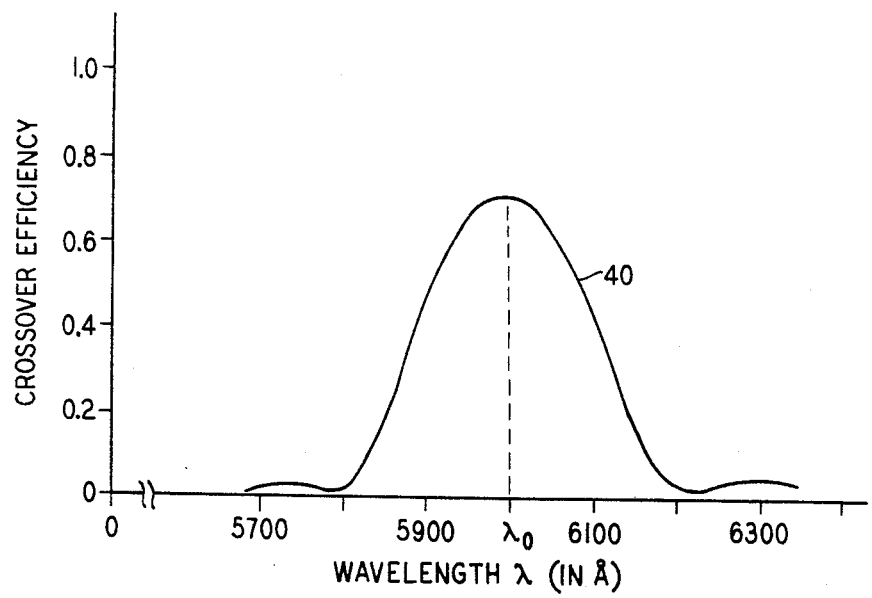
FIGS. 4–7 are graphs useful in explaining the operation of the present invention.

The type of filter function provided by an optical filter of the type illustrated in FIG. 1 is shown in FIG. 4. Line 40 in FIG. 4 corresponds to an experimentally measured filter response obtained by measuring a specific device with a tunable dye laser input. The measured filter response 40 was made on a device having width $W_1$ equal to 1.5 micrometers and a width $W_2$ equal to 3 micrometers with an interaction length L equal to 1 centimeter and a gap G equal to 4 micrometers. The deposits of titanium metal were equal to 500Å for the narrow waveguide and 350Å for the wider waveguide. As can be seen in FIG. 4, the crossover efficiency is equal to approximately 70 percent.

Figure 2:
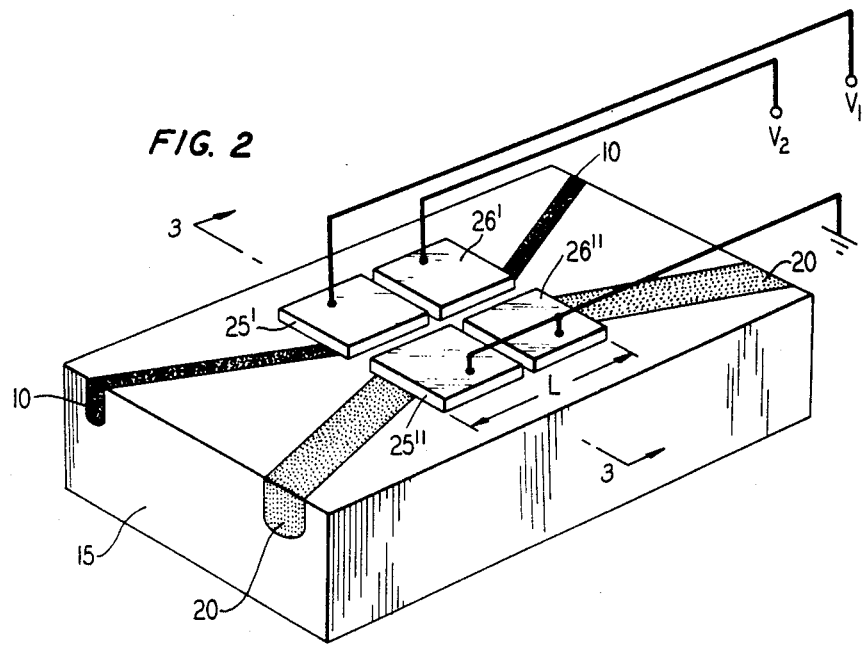
FIG. 2 is a pictorial diagram of a particular example of an optical filter constructed in accordance with the present invention.
Figure 3:
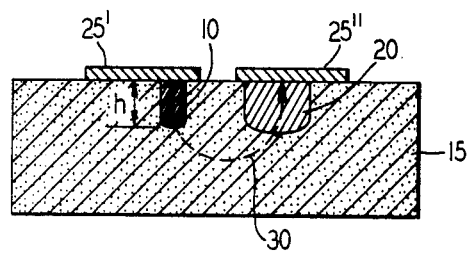
FIG. 3 is a cross-sectional diagram of the optical filter illustrated in FIG. 2.

In accordance with the present invention, two pairs of electrodes 25 and 26 are deposited over both waveguides 10 and 20 as shown in FIG. 2. Each electrode pair has one of its electrodes (25' and 26') positioned over the narrow waveguide 10 in the interaction length region and its other electrode (25" and 26") positioned over the wider electrode. The electrode pairs are also positioned in juxtaposition such that a potential applied to either one of the electrode pairs causes an electrical field to be established in the waveguides as illustrated by ray 30 in FIG. 3. As indicated in FIG. 3, the electric field in one of the waveguides is opposite in direction to the electric field established in the other waveguide. As a result equal potentials can be applied across both electrode pairs thereby causing a change in the dispersive relation versus wavelength for both of the waveguides. By applying a potential V across both of the electrode pairs, the curves 51 and 52 of effective index N versus wavelength are caused to move to the new positions 53 and 54, respectively, in FIG. 5. Since the electric field in the two waveguides is in opposite directions, the effective index of one guide is caused to increase at any given wavelength whereas the effective index of the other guide is caused to decrease at that wavelength. The overall result is that the new dispersive relations 53 and 54 corresponding to the condition which exists when a potential V is applied to each of the electrode pairs intersect at a new wavelength $\lambda_V$. Accordingly, the filter response characteristic is shifted so that its filter center wavelength corresponding to maximum crossover efficiency now occurs at the wavelength $\lambda_V$.

Figure 6:
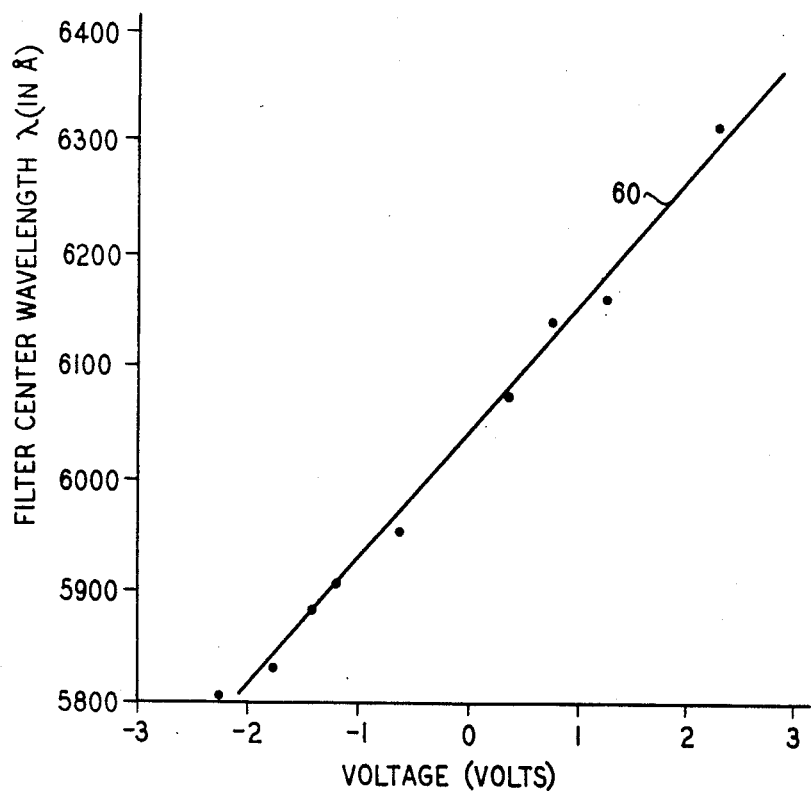

The electro-optic induced fractional shift of the center wavelength $\Delta\lambda_0/\lambda_0$ is determined by the voltage induced fractional change in $(\Delta n_1 - \Delta n_2)$. This latter difference for waveguides in lithium niobate is typically small in the order of $5 \times 10^{-3}$. Changes of this magnitude can be achieved through the linear electro-optic effect with reasonable voltages. The type of change in the filter center wavelength that can be obtained for specific changes in voltage on one of the constructed devices is illustrated by curve 60 in FIG. 6. For the device illustrated by curve 60 in FIG. 6, a broad tuning rate of approximately 100Å volt/was achieved. The shape of the filter response when the device is voltage tuned is essentially the same as the response shown by curve 40 in FIG. 4.

It is an advantageous feature of the present invention that the crossover efficiency can be increased at any of the center wavelengths to approximately 100 percent. This advantageous feature is a consequence of the split electrode configuration. After electrically tuning a given filter to achieve a desired center (phase-match) wavelength by applying equal potentials across each of the electrode pairs, the potential on each of the electrode pairs is perturbed or changed by a substantially equal and opposite amount relative to the other electrode pair. If the amount of voltage changed is represented by V', the voltage $V_1$ on one of the electrode pairs is caused to be equal to $V + V'$ and the voltage on the other electrode pair $V_2$ is caused to be equal to $V - V'$. Application of these perturbed voltages on each of the electrode pairs 25 and 26 results in substantially complete crossover providing that the interaction length L is greater than one and less than three coupling lengths. The value of V' depends upon the length L and the strength of coupling between the waveguides.

Figure 7:
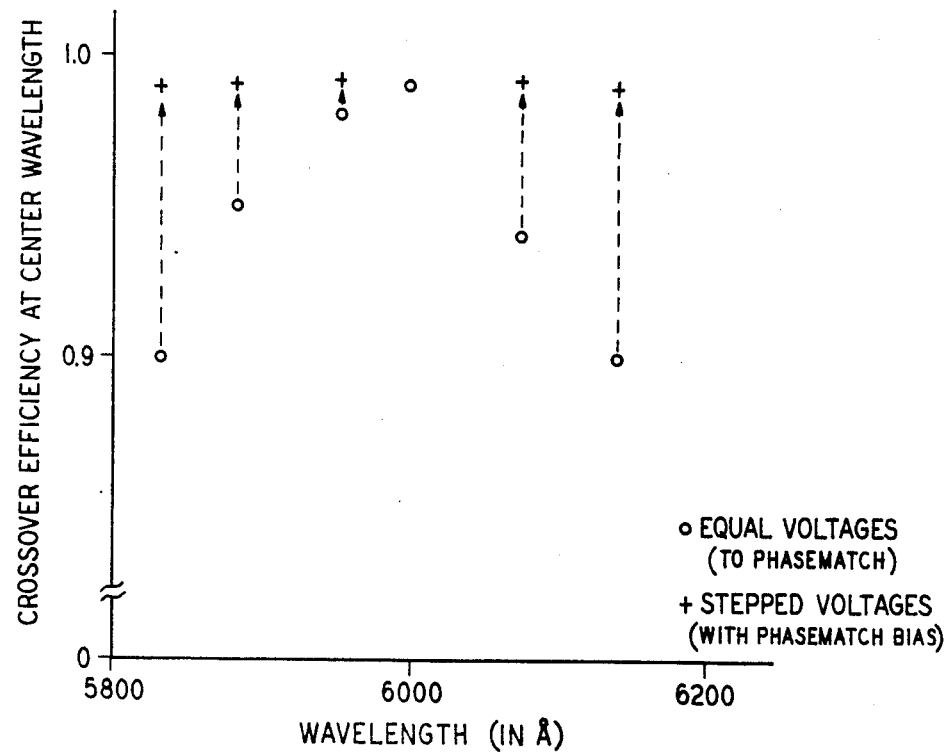

The type of changes in maximum crossover efficiency (i.e., the crossover efficiency at the filter center wavelength) that can be obtained in an optical filter are represented by the points shown in FIG. 7. The circles of this figure represent the crossover efficiency obtained at various wavelengths by applying identical potentials across both of the electrode pairs. The crosses in this figure represent the maximum crossover efficiency that can be obtained by changing the potentials across each of the electrode pairs by equal but opposite amounts. As indicated in FIG. 7, a crossover efficiency of close to 100 percent can be obtained at all of the wavelengths to which the optical filter can be tuned, despite the change in coupling strength with wavelength.

What has been described hereinabove is a specific embodiment of the present invention. Numerous departures may be made by those skilled in the art without departing from the spirit and scope of the present invention. For example, the device described can also be utilized to provide real-time wavelength-dependent switching or amplitude modulation by applying the proper time dependent potentials to the electrode pairs. As a wavelength-dependent amplitude modulator the device can be utilized to simultaneously provide modulation and wavelength multiplexing functions. In addition, other substrate materials can be utilized in place of the lithium niobate, and materials other than titanium may be diffused into the substrate in order to obtain an increased refractive index. Other electrode configurations that are capable of producing the same electro-optic effect will also be apparent to those skilled in the art.

Figure 8:
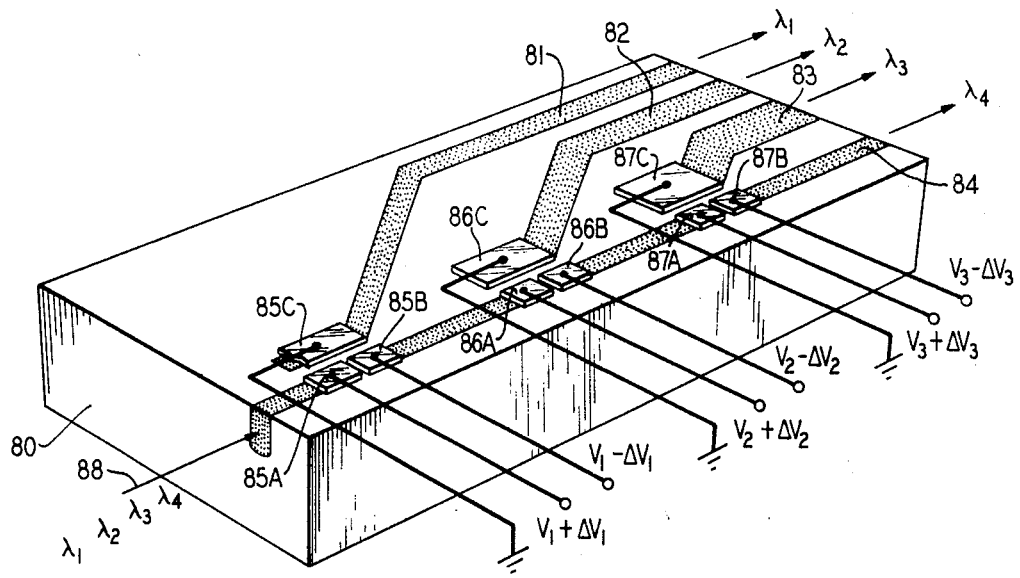
FIGS. 8–9 are pictorial of wavelength mutiplexing filters constructed in accordance with the present invention.

Several of the above-described devices can be used in series to provide a device which is capable of multiplexing or demultiplexing an arbitrary number of carrier wavelengths. A device which is capable of multiplexing or demultiplexing four separate carrier wavelengths is shown in FIG. 8. Four separate waveguides 81, 82, 83 and 84 are established in a lithium niobate substrate 80 by diffusing titanium metal strips of different widths and metal thicknesses into the lithium niobate substrate. As shown in FIG. 8, waveguide 84 is the narrowest waveguide and it is formed in the substrate in a substantially straight line between two opposite ends of substrate 80. Waveguides 81, 82, and 83 are progressively wider and fabricated with appropriate metal thickness as described above. They are formed in substrate 80 such that each of these waveguides are proximate to waveguide 84 for a predetermined interaction length. A single electrode is positioned over each portion of waveguides 81, 82, and 83 corresponding to the interaction length. These electrodes are designated as 85C, 86C and 87C in FIG. 8, and electrode 85C is broken away at the left end in order to clearly illustrate that each of the electrodes is positioned over a waveguide portion in the substrate. Two electrodes are positioned over each section of waveguide 84 that is proximate to the sections of waveguides 81 through 83. These electrodes are designated as 85A, 85B, 86A, 86B, 87A and 87B in FIG. 8. The single electrodes 85C, 86C and 87C are each connected to ground potential and different voltages are applied to each of the remaining electrodes positioned over waveguide 84 in order to move the central frequency of each filter to the proper wavelength and, in addition, to increase the crossover efficiency at that wavelength to a maximum value close to 100 percent. In operation as a demultiplexer, four separate wavelengths can be coupled into one end of waveguide 84 as shown by ray 88 and these wavelengths are spatially separated by filter devices 85, 86, and 87 so as to provide a single wavelength at the output of each of the waveguides 81 through 84. The operation of the device is reciprocal, and therefore four separate wavelengths may just as easily be combined into a single waveguide.

Figure 9:
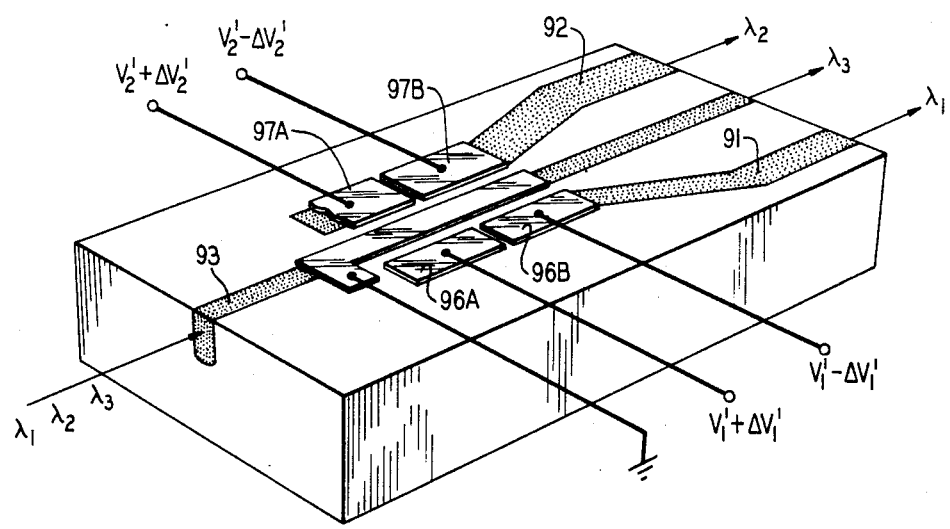

In the special case where it is necessary to multiplex or demultiplex only three different carrier wavelengths, a device consisting of three strip waveguides and electrodes as shown in FIG. 9 can be used. In this configuration three parallel waveguides 91, 92, and 93 are in close proximity over an interaction length such that light may be simultaneously coupled between the center waveguide 93 and either outer waveguide 91 or 92. The outer waveguides 91 and 92 are sufficiently spatially separated that there is no coupling directly between them. In a manner similar to that described above, the waveguides are fabricated such that the dispersion curves of the center waveguides 93 and one outer waveguide 91 intersect at $\lambda_1$ while that of the center waveguide 93 and the other outer guide 92 intersect at $\lambda_2$. Carrier wavelengths $\lambda_1$, $\lambda_2$, and $\lambda_3$ are spectrally separated by several filter bandwidths.

As shown in FIG. 9, a single electrode is deposited over waveguide 93 in the region where this waveguide is proximate to waveguides 91 and 92. Two electrodes (96A-96B and 97A-97B) are deposited over the equivalent interaction region of waveguides 91 and 92, respectively. By applying the appropriate potentials to these electrodes and thereby using the electro-optic effect as described hereinabove, the filter center wavelengths $\lambda_1$ and $\lambda_2$ can be electrically tuned by the bias voltages $V_1'$ and $V_2'$. Furthermore, the crossover efficiencies at these wavelengths can be electrically adjusted to near 100 percent by application of the appropriate perturbation voltages $\pm\Delta V_1'$ to the electrode pair 96A-96B of the lower guide 91 and $\pm\Delta V_2'$ to the electrode pair 97A-97B of the upper guide 92.

What is claimed is:

1. An electrically adjustable optical filter comprising an electro-optic substrate, a first dielectric waveguide in said substrate having a combination of dimensions and refractive index, a second dielectric waveguide in said substrate having a different combination of dimensions and refractive index such that its propagation constant is identical to that of said first dielectric waveguide at only one wavelength, said first dielectric waveguide being arranged in spatial orientation with respect to said second dielectric waveguide such that the two waveguides are proximate to each other over a sufficient interaction length whereby light energy is selectively coupled between said first and second waveguides only in a range of wavelengths substantially centered about said one wavelength, characterized in that said filter further includes electrode means mounted near said first and second dielectric waveguides such that a potential applied to said electrode means can produce opposite changes in the refractive indices of said first and second waveguides.

2. An optical filter of the type defined in claim 1 wherein said electrode means has an electrode configuration such that different electric field intensities can be established over each half of said interaction length.

3. An optical filter of the type defined in claim 2 wherein said electrode means comprises two separate pairs of electrodes mounted over said first and second dielectric waveguides, each one of said pairs being mounted such that a potential applied across that pair establishes an electric field intensity in only one-half of said interaction length.

4. An optical filter of the type defined in claim 2 wherein said substrate consists primarily of lithium niobate, and said first and second dielectric waveguides are defined in said substrate by the presence of titanium in said substrate.

5. An electrically adjustable optical multiplexer/demultiplexer comprising:
   an electro-optic substrate;
   a first dielectric waveguide in said substrate having a combination of dimensions and refractive index;
   a plurality of secondary waveguides in said substrate each having a combination of dimensions and refractive index that is different both from said first waveguide and from each other such that each one of said plurality of secondary waveguides has a propagation constant identical to that of said first waveguide at only one wavelength, said secondary waveguides being arranged in spatial orientation with respect to said first waveguide such that each one of said secondary waveguides is proximate to said first waveguide over a sufficient interaction length, whereby light energy is selectively coupled between said first waveguide and said each one of said secondary waveguides in a range of wavelengths substantially centered about the one wavelength corresponding to the two interacting waveguides; and a plurality of electrode means each one of which is mounted near the interaction length of said first waveguide and one of said secondary waveguides such that a potential applied to the corresponding electrode means can produce opposite changes in the refractive indices of said first waveguide and said one of said secondary waveguides.

6. An optical multiplexer/demultiplexer as defined in claim 5 wherein each one of said electrode means includes a single electrode deposited over each one of said secondary waveguides in the interaction length region of said waveguides, and two electrodes deposited over said first waveguide in the interaction length region of said first waveguide.

7. An optical multiplexer/demultiplexer as defined in claim 5 wherein at least two of said secondary waveguides are spatially oriented with respect to said first waveguide such that said two secondary waveguides have a common interaction length region in said first waveguide.

8. An optical multiplexer/demultiplexer as defined in claim 7 wherein said electrode means includes a single electrode deposited over said first waveguide in the common interaction length region, and at least two electrodes deposited over each one of said two secondary waveguides in the interaction length region.